United States Patent [19]

Berchem et al.

[11] Patent Number: 4,795,133
[45] Date of Patent: Jan. 3, 1989

[54] BALL VALVE WITH A CERAMIC VALVE BALL AND CERAMIC SEAT RINGS

[75] Inventors: Rütger Berchem, Gelsenkirchen; Georg Prokscha, Recklinghausen; Herbert Heidemeyer, Hagen, all of Fed. Rep. of Germany

[73] Assignee: B + S Metalpraecis Gesellschaft fur Metallformgebung m.b.H., Gelsenkirchen, Fed. Rep. of Germany

[21] Appl. No.: 128,819

[22] Filed: Dec. 4, 1987

[30] Foreign Application Priority Data

Dec. 6, 1986 [DE] Fed. Rep. of Germany ....... 3641741

[51] Int. Cl.⁴ ............................................. F16K 5/20
[52] U.S. Cl. .................................. 251/171; 251/315; 251/368; 251/172
[58] Field of Search ............... 251/170, 171, 172, 174, 251/315, 368

[56] References Cited

U.S. PATENT DOCUMENTS

| | | | |
|---|---|---|---|
| 2,950,896 | 8/1960 | Buttiker | 251/172 |
| 3,486,733 | 12/1969 | Gordon, Jr. | 251/172 |
| 4,257,574 | 3/1981 | Chacour | 251/172 |
| 4,345,738 | 8/1982 | Ripert | 251/172 X |

FOREIGN PATENT DOCUMENTS 0029732 11/1980 European Pat. Off.

*Primary Examiner*—A. Michael Chambers
*Assistant Examiner*—John C. Fox
*Attorney, Agent, or Firm*—Herbert Dubno

[57] ABSTRACT

The ball valve, especially for a solvent-containing flow and/or an abrasive solid mixture, has a housing, a sintered ceramic valve seat, a sintered ceramic valve ball and an operating shaft for the valve ball guided through a shaft seal in the housing. The valve ball is positioned free of an elastic seal between seating surfaces of the valve seat and the valve seat has at least two sintered ceramic seat rings which are mounted in the housing and which are acted on with a pressing force by an elastic element supported in the housing. The valve ball is positioned between the seat rings which seal on the housing and are acted on with a sealing force. The seat rings have a plurality of seating surfaces which are formed like the surface of an inner core and contact tangentially on the valve ball along circumferential sealing lines. The elastic element providing the pressing force can be a compressible spring but it can also be a compressible medium fed to a compression chamber positioned adjacent at least one seat ring.

5 Claims, 3 Drawing Sheets

BALL VALVE WITH A CERAMIC VALVE BALL AND CERAMIC SEAT RINGS

CROSS REFERENCE TO RELATED APPLICATION

This application is related to the commonly assigned copending application Ser. No. 07/101,187, filed Sept. 25, 1987.

1. Field of the Invention

Our present invention relates to a valve and, more particularly, to a ball valve for a solvent-containing and/or a solids-containing (abrasive) flow.

2. Background of the Invention

A ball valve, especially for a solvent-containing flow and/or a flow containing an abrasive solid mixture, can comprise a housing, a sintered-ceramic valve seat, a sintered-ceramic valve ball and an operating shaft for the valve ball guided through a shaft seal in the housing.

In a known ball valve (see European Pat. No. 00 29 732) of this type, the valve seat has a movable seat ring with a seat surface only on the inlet side. On the outlet side the seat surfaces are worked into the housing. The seat surfaces are ground spherical surfaces. The sealing action is in need of improvement at high operating pressures.

OBJECTS OF THE INVENTION

It is an object of our invention to provide an improved valve, particularly a ball valve, which will avoid these drawbacks of this earlier valve.

It is another object of our invention to provide an improved ball valve which has good sealability and also is usable as a nonleaking shutoff valve at high operating pressures.

It is a further object of our invention to provide an improved ball valve which is usable as a shutoff valve at high operating pressures with a flow containing abrasive solids and/or solvents.

SUMMARY OF THE INVENTION

These objects and others which will become more readily apparent hereinafter are attained in accordance with our invention in a ball valve, especially for a solvent-containing flow and a flow with an abrasive solid mixture, comprising a housing, a ceramic valve seat, a ceramic valve ball and an operating shaft for the valve ball guided through a shaft seal in the housing. The valve ball is positioned free from any elastomeric seal between seating surfaces of the valve seat. The valve seat has a ceramic seat ring which is mounted in the housing with a sealing piece interposed between it and the housing and is acted on with a pressing force by an elastic element supported in the housing. The ceramic in each case is preferably a sintered ceramic.

According to our invention the valve ball is positioned between two seat rings which seal on the housing and are acted on by a sealing force. The seat rings both have seating surfaces which are formed like the surface of an inner cone (i.e. inner frustoconical contacting surfaces) and each contacts tangentially the spherical surface of the valve ball along at least a circumferential sealing line.

The relatively large-area contact surfaces between the valve ball and the seat surfaces of the seat rings of the prior art are replaced by a circumferential sealing line according to our invention. By "sealing line" we mean a line of contact with one of the opposing seat surfaces of negligible width.

Our invention is based on the fact which we have discovered that an effective seal between the seat rings and the valve ball does not require a large area sealing surface but instead a large surface or contact pressure, i.e. pressing force per unit area.

With a predetermined pressing force between the valve ball and the seat rings, the surface pressure is larger as the contacting surface area is decreased. On the other hand the requirements for the accuracy of the dimensions and surface quality of the sealing elements acting on each other are noticeably increased with decreasing width.

Surprisingly it has been established that with a ball valve with sintered ceramic seat rings and a sintered ceramic valve ball a very good seal is attained when the contacting surfaces degenerate to a sealing line of negligible width—i.e. to a contacting line in the mathematical sense.

The seat rings can contact on an elastic element supported in the housing. In the scope of our invention a soft seal is used as an elastic element which is simultaneously a seal and a spring member. The use of a soft seal as the elastic element however assumes that the structural length of the assembly comprising the seat rings and the valve ball is very exactly maintained. A gap compensation required for wear is only possible to a limited extent.

When larger tolerances should be provided, our invention provides a compressible spring which contacts on the front side of the seat rings.

The sealing of the seat rings against the housing is effected appropriately by soft seals arranged on the outer circumference of the sealing rings.

Alternatively, a hydraulically or pneumatically operable pressing device is associated with the seat ring. This pressing device allows an exact adjustment of the pressing force on the seat rings and the surface pressure on the sealing lines independently of the state of the wear.

It provides further a variable adjustment of the pressing force so that the pressing force is reduced on operation of the valve ball and is increased in the operating position. Hence, the wear on the valve ball and on the seat surfaces of the seat rings is reduced. Without that the sealing action in the standard operating state suffers.

Further the positioning and/or driving forces required for the operation of the valve ball are reduced on account of the reduced friction at the sealing lines so that smaller drive units can be used during operation.

For formation of a hydraulically or pneumatically operable pressing device the invention teaches in regard to structure that the pressing device has a compression chamber associated with the seat rings for a compressible medium on which the seat ring is mounted or connected with a sealing member interposed.

The ball valve according to our invention has numerous advantages compared to the known valve.

It is characterized by a very good seal and reduced leak rate even at high operating pressures.

The driving force for operation of the valve ball and the required loosening torque with flows tending toward incrustation formation is reduced on account of the small contacting surfaces between the seat rings and the valve ball.

Because of the lines of contact of the valve ball and the seat rings the danger of clogging by solid particles between the valve ball and the valve seat does not exist. The invention, therefore eliminates sealing problems by jamming or clogging solid particles and furthermore reduces the wear on the sealing surfaces inspite of larger surface pressure.

With conically ground seat surfaces of the seat rings process engineering advantages result as well.

Hence, the valve ball and the seat ring need not be ground or reseated pairwise as with spherically ground seat rings, the spare part or replacement situation is simplified and the storage costs are reduced.

BRIEF DESCRIPTION OF THE DRAWING

The above and other objects, features and advantages of our invention will become more readily apparent from the following description, reference being made to the accompanying highly diagrammatic drawing in which.

SPECIFIC DESCRIPTION

Figure 1:
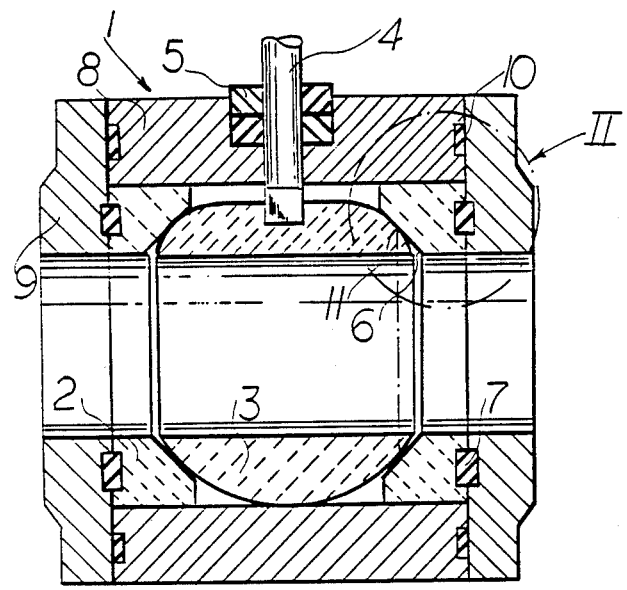
FIG. 1 is a longitudinal cross sectional view through a portion of a ball valve according to our invention.

The ball valve illustrated in FIGS. 1 to 4 is particularly suitable for a solvent-containing flow and a flow (liquid) containing abrasive solid mixtures.

The valve basically comprises a pressure resistant housing 1, a valve seat made of sintered ceramic seat rings 2 and a sintered ceramic valve ball 3 with an operating shaft 4 which is guided through a shaft seal 5 of the housing 1.

The valve ball 3 is positioned free of an elastic seal between seat surfaces 6 of the seat rings 2. The seat rings 2 are braced or supported on sealing pieces 7 against the housing 1.

Figure 2:
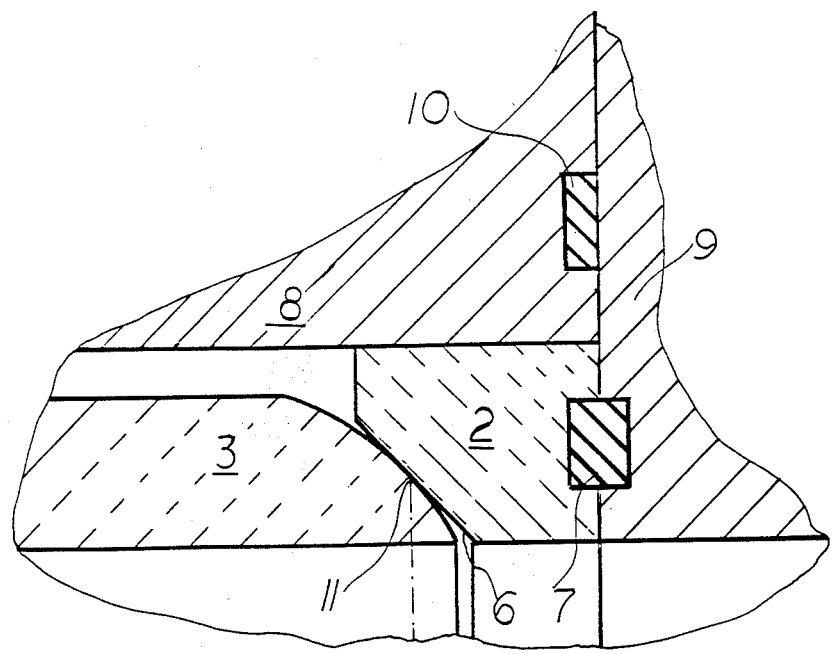
FIG. 2 is an enlarged detail longitudinal cross sectional view of the portion of the ball valve indicated with the dot-dash line 11 of FIG. 1.

In the embodiment illustrated in FIGS. 1 and 2 the sealing pieces 7 are elastic elements each of which is a soft seal which is simultaneously a seal and a spring member. The housing 1 is constructed of several parts (held together by bolts, not shown) and comprises a bonnet member 8 and a flange member 9 which are bolted together with a housing packing 10 interposed between them.

The valve ball 3 contacts along at least one circumferential sealing line 11 on each of the seat surfaces 6 of the seat rings 2.

The sealing lines 11 have a negligible width relative to the seat surfaces 6.

Figure 4:
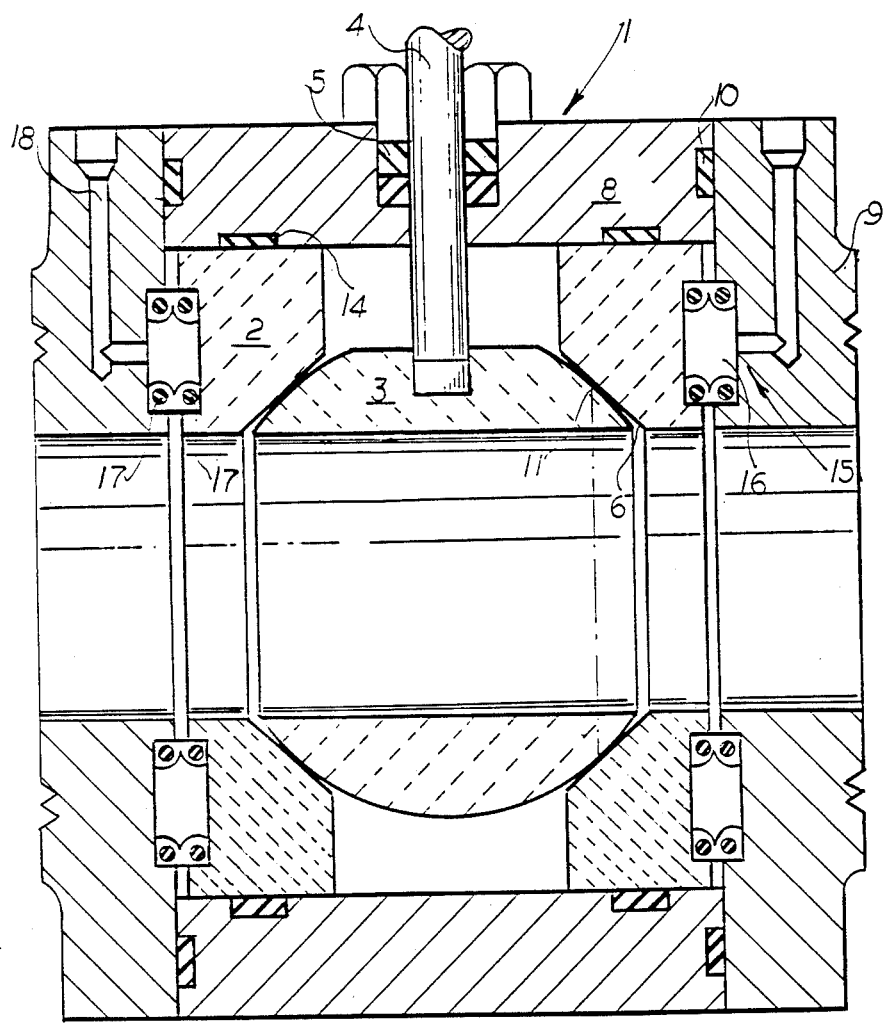
FIG. 4 is a longitudinal cross sectional view through an additional embodiment of a ball valve according to our invention.

In the embodiment of our invention illustrated in FIGS. 1, 2 and 4 the seat surfaces 6 of the seat rings 2 are formed like a surface of an inner cone which contacts tangentially on the valve ball 3. The seal is effected on a circular sealing line 11.

Figure 3:
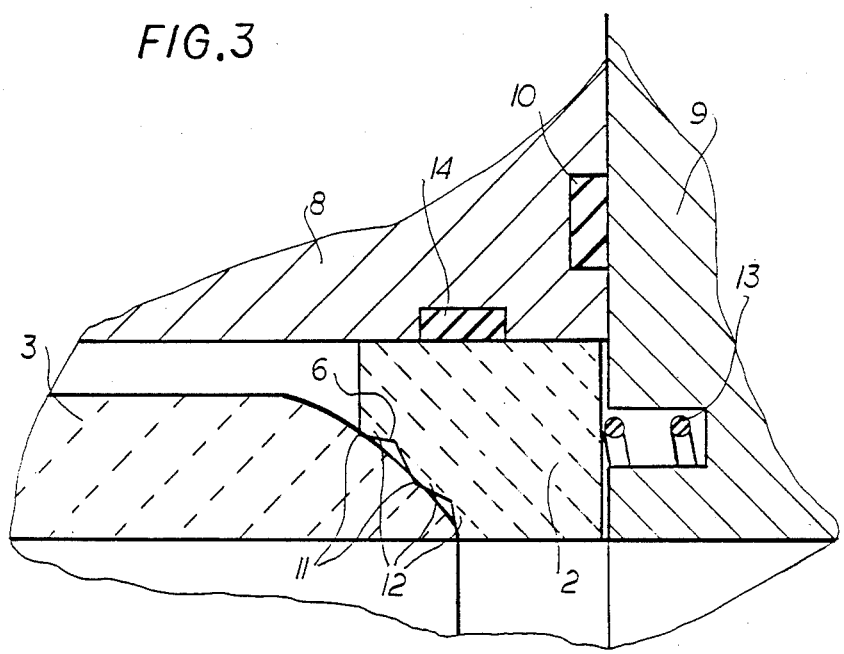
FIG. 3 is a detail section similar to FIG. 2 but of a portion of another embodiment of a ball valve according to our invention.

In the example of our invention shown in FIG. 3 the seat surfaces 6 of the seat rings 2 are formed as profiled surfaces with sealing ribs 12. The seal occurs on a plurality of sealing lines 11 spaced from each other. The front sides of the seat rings 2 contact on a compressible spring 13 as well as on a sealing piece, e.g. a soft seal 14, on their outer circumference.

The compressible spring 13 allows a larger longitudinal compensation without impairing the compression force compared to an elastic spring member and thus provides for balanced wear on the sealing ribs 12.

In the embodiment illustrated in FIG. 4 a hydraulically or pneumatically operable sealing pressing device 15 is associated with the seat rings 2. This pressing device 15 basically comprises at least one compression chamber 16 associated with the seat ring 2 on which the seat ring 2 is mounted with a sealing member 17 interposed. The compression chamber 16 in this example is a ring chamber. A compressible medium can be fed to the compression chamber 16 through a passage 18 in the housing 1. A precise adjustment of the pressing force and the surface pressure on the sealing lines 11 is possible using this pressing device 15. Advantageously the pressing force is reduced during rotation of the valve ball 3 and increased in the standard open or closed state of the valve.

We claim:

1. A ball valve for a flowable mixture having abrasive particles or containing a solvent, having a generally cylindrical housing, said housing comprising:

a pressure-sustaining valve-housing sleeve with a cylindrical inner wall centered upon a longitudinal axis of said housing;

a pair of flange members coaxial with said valve-housing sleeve along said longitudinal axis and abutting said valve-housing sleeve at opposite ends of said valve-housing sleeve for connecting said valve-housing sleeve in a pipeline traversed by the mixture, said flange members extending inwardly of said wall and having respective axially extending wear surfaces at an inlet and outlet side of a passage extending through the valve, said wear surfaces of said flange members forming walls of said passage;

a pair of annular sintered-ceramic valve seat rings in said valve-housing sleeve axially juxtaposed with said flange members and being coaxial with said valve-housing sleeve, each of said seat rings being in contact with said inner wall and provided with:

an axially extending wear surface aligned with said wear surfaces of said flange members and forming another wall of said passage, an outer peripheral surface surrounded by and in contact with said inner wall, an outer annular face axially juxtaposed with the respective flange member, and an inner frustoconical surface opposite said outer annular face;

a sintered-ceramic valve ball having a bore registering with said passage, said ball being rotatable about an axis of rotation in said valve-housing sleeve perpendicular to said longitudinal axis for controlling flow through the ball valve, said bore having an axially extending wear surface lined up with said wear surfaces of the seat ring and the flange members, said ball being further formed with an outer curved surface, tangentially contacted by the respective inner frustoconical surface of the respective seat ring along a respective single circumferential sealing line for each ring;

sealing means between each of said rings and the valve-housing sleeve;

an actuating shaft connecting to said valve ball for rotating same, said valve-housing sleeve being formed with a transverse bore along said axis of rotation perpendicular to said longitudinal axis traversed by said shaft, said shaft being guided through a shaft seal in said valve-housing sleeve; and pressing means between said flange members and the respective outer annular faces of said seat rings for urging the seat rings against the respective curved surface of the valve ball, so that said seat rings engage directly on said ball, free from any elastic seal between the valve ball and the respective inner frustoconical surfaces of said seat rings, with a pressing force only along the respective single circumferential sealing lines.

2. The ball valve defined in claim 1 wherein said pressing means is an O-ring.

3. The ball vale defined in claim 1 wherein said pressing means are compressible springs between the seat rings and the respective flange members.

4. The ball valve defined in claim 1 wherein said pressing means comprises:
   means forming a compression chamber, said compression chamber being sealed to the respective seat ring,
   a plurality of elastic elements in said chamber, and
   means forming a passage for a compressible medium in said flange members so that said medium can be fed to said chamber to actuate said elastic elements and adjust a pressing force for sealing said rings against said ball along said circumferential sealing lines and continuously regulates said force in accordance with a position of said valve ball.

5. A ball valve for a flowable mixture having abrasive particles or containing a solvent, having a generally cylindrical housing, said housing comprising:
   a pressure-sustaining valve-housing sleeve with a cylindrical inner wall centered upon a longitudinal axis of said housing;
   a pair of flange members coaxial with said valve-housing sleeve along said longitudinal axis and abutting said valve-housing sleeve at opposite ends of said valve-housing sleeve for connecting said valve-housing sleeve in a pipeline traversed by the mixture, said flange members extending inwardly of said wall and having respective axially extending wear surfaces at an inlet and outlet side of a passage extending through the valve, said wear surfaces of said flange members forming walls of said passage;
   a pair of annular sintered-ceramic valve seat rings in said valve-housing sleeve axially juxtaposed with said flange members and being coaxial with said valve-housing sleeve, each of said seat rings being in contact with said inner wall and provided with:
      an axially extending wear surface aligned with said wear surfaces of said flange members and forming another wall of said passage,
      an outer peripheral surface surrounded by and in contact with said inner wall,
      an outer annular face axially juxtaposed with the respective flange member, and
      an inner generally frustoconical surface opposite said outer annular face and formed with a plurality of annular ribs having respective sealing edges;
   a sintered-ceramic valve ball having a bore registering with said passage, said ball being rotatable about an axis of rotation in said valve-housing sleeve perpendicular to said longitudinal axis for controlling flow through the ball valve, said bore having an axially extending wear surface lined up with said wear surfaces of the seat ring and the flange members, said ball being further formed with an outer curved surface, contacted by the respective edges of the inner frustoconical surface of the respective seat ring along respective circumferential sealing lines for each ring;
   sealing means between each of said rings and the valve-housing sleeve;
   an actuating shaft connecting to said valve ball for rotating same, said valve-housing sleeve being formed with a transverse bore along said axis of rotation perpendicular to said longitudinal axis traversed by said shaft, said shaft being guided through a shaft seal in said valve-housing sleeve; and
   pressing means between said flange members and the respective outer annular faces of said seat rings for urging the seat rings against the respective curved surface of the valve ball, so that said seat rings engage directly on said ball, free from any elastic seal between the valve ball and the respective inner generally frustoconical surfaces of said seat rings, with a pressing force only along the respective circumferential sealing lines.

* * * * *